(12) United States Patent
Wu et al.

(10) Patent No.: US 8,401,991 B2
(45) Date of Patent: Mar. 19, 2013

(54) DATABASE-BASED INFERENCE ENGINE FOR RDFS/OWL CONSTRUCTS

(75) Inventors: Zhe Wu, Westford, MA (US); George Eadon, Hollis, NH (US); Souripriya Das, Nashua, NH (US); Eugene Inseok Chong, Concord, MA (US); Vladimir Kolovski, Nashua, NH (US); Melliyal Annamalai, Nashua, NH (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 758 days.

(21) Appl. No.: 12/188,267

(22) Filed: Aug. 8, 2008

(65) Prior Publication Data

US 2010/0036788 A1 Feb. 11, 2010

(51) Int. Cl.
*G06F 17/30* (2006.01)
(52) U.S. Cl. ........................ 707/602; 707/603
(58) Field of Classification Search .................... 707/600
See application file for complete search history.

(56) References Cited

U.S. PATENT DOCUMENTS

| 2006/0036633 | A1* | 2/2006 | Chong et al. ................. | 707/101 |
| 2007/0094256 | A1* | 4/2007 | Hite et al. ........................ | 707/6 |
| 2008/0162498 | A1* | 7/2008 | Omoigui ........................ | 707/10 |
| 2008/0168082 | A1* | 7/2008 | Jin et al. ........................ | 707/102 |
| 2008/0243884 | A1* | 10/2008 | Mehta ............................ | 707/100 |
| 2009/0055439 | A1* | 2/2009 | Pai et al. ........................ | 707/200 |
| 2010/0049763 | A1* | 2/2010 | Jung et al. ........................ | 707/721 |

OTHER PUBLICATIONS

Rakesh Agrawal, "Direct Algorithms for Computing the Transitive Closure of Database Relations", Proceedings of the 13th VLDB Conference, 1987, pp. 255-266, Brighton.
AllegroGraph 4.4, http://www.franz.com/agraph/allegrograph/.
Franz Baader et al., "CEL-A Polynomial-Time Reasoner for Life Science Ontologies", Theoretical Computer Science, 6 pages, TU Dresden, Germany.
Jeen Broekstra et al., "Sesame: A Generic Architecture for Storing and Querying RDF and RDF Schema", 16 pages, The Netherlands.
Diego Calvanese et al., "DL-LITE: Tractable Description Logics for Ontologies", American Association for Artificial Intelligence, pp. 602-607, 2005.
Guozhu Dong et al., "Maintaining Transitive Closure of Graphs in SQL", 23 pages.

(Continued)

*Primary Examiner* — Neveen Abel Jalil
*Assistant Examiner* — Kevin L Young
(74) *Attorney, Agent, or Firm* — Vista IP Law Group, LLP

(57) ABSTRACT

An un-indexed, partitioned temporary table and an exchange table are used in the inferencing of semantic data in a relational database system. The exchange table has the same structure as a semantic data table storing the semantic data. In the inferencing process, a new partition is created in the semantic data table. Inference rules are executed on the semantic data table, and any newly inferred semantic data generated is added to the temporary table. Once no new data is generated, the inferred semantic data is copied from the temporary table into the exchange table. Indexes that are the same as indexes for the semantic data table are built for the exchange table. The indexed data in the exchange table is then exchanged into the new partition in the semantic data table. By use of the un-indexed, partitioned temporary table, incremental maintenance of indexes is avoided, thus allowing for greater efficiency.

20 Claims, 11 Drawing Sheets

OTHER PUBLICATIONS

Benjamin N. Grosof et al., "Description Logic Programs: Combining Logic Programs with Description Logic", ACM, May 20-24, 2003, 10 pages, Budapest, Hungary.

Ian Horrocks et al., "A Tableaux Decision Procedure for SHOIO", 6 pages, School of Computer Science, University of Manchester, UK.

Herman J. Ter Horst, "Completeness, decidability and complexity of entailment for RDF Schema and a semantic extension involving the OWL vocabulary", Philips Research, 59 pages, The Netherlands.

Ullrich Hustadt et al., "Data Complexity of Reasoning in Very Expressive Description Logics", 6 pages.

Ullrich Hustadt et al., "Reasoning in Description Logics by a Reduction to Disjunctive Datalog", Paper Tex, Feb. 7, 2007, 42 pages, Kluwer Academic Publishers. Printed in the Netherlands.

Yannis E. Ioannidis, "On the Computation of the Transitive Closure of Relational Operators", Proceedings of the Twelfth International Conference on Very Large Data bases, Aug. 1986, pp. 403-411, Kyoto.

Atanas Kiryakov et al., "OWLIM—a Pragmatic Semantic Repository for OWL", 11 pages, Ontotext Lab, Sirma Group Corp., 135 Tsarigradsko Chaussee, Sofia 1784, Bulgaria, 2005.

Li Ma et al., "RStar: An RDF Storage and Query System for Enterprise Resource Management", ACM, Nov. 8-13, 2004, pp. 484-491, CIKM 04, Washington D.C., U.S.A.

Chaoyi Pang et al., "Incremental Maintenance of Shortest Distance and Transitive Closure in First-Order Logic and SQL", ACM, Apr. 2005, pp. 111-134, vol. V, No. N., ACM Transactions on Computational Logic.

Nigel Shadbolt et al., "The Semantic Web Revisited", IEEE, 2006, pp. 96-101, Published by the IEEE Computer Society.

Heiner Stuckenschmidt et al., "Time—Space Trade-offs in Scaling up RDF Schema Reasoning", 10 pages, 2005.

Silke Trissl et al., "Fast and Practical Indexing and Querying of Very Large Graphs", SIGMOD, Jun. 2007, 12 pages, Beijing, China.

Taowei David Wang et al., "A Survey of the Web Ontology Landscape", 13 pages, Department of Computer Science, University of Maryland, College Park, MD 20742, USA, 2006.

Kevin Wilkinson et al., "Efficient RDF Storage and Retrieval in Jena2", First International Workshop on Semantic Web and Databases, 18 pages, Sep. 7, 2003, Berlin, Germany.

Zhe Wu et al., "Implementing an Inference Engine for RDFS/OWL Constructs and User-Defined Rules in Oracle", 10 pages, 1 Oracle Drive, Nashua, NH 03062, USA, Apr. 2008.

Owlim, "Pragmatic OWL Semantic Repository", Apr. 2008, 71 pages, Ontotext Lab, Sirma Group Corp.

Dave Reynolds, "Jena 2 Inference Support", 34 pages, Jan. 11, 2007.

Chuck Murray, "Oracle Database, Semantic Technologies Developer's Guide, Guide, 11g Release 1 (11.1)", Sep. 2007, 96 pages.

OWL Web Ontology Language Semantics and Abstract Syntax, W3C Recommendation, Feb. 10, 2004, http://www.w3.org/TR/owl-semantics.

RDF Semantics, W3C Recommendation, Feb. 10, 2004, http://www.w3.org/TR/rdf-mt/.

Pellet, http://mindswap.org/2003/pellet/, 2003.

* cited by examiner

| Subject | Predicate | Object |
|---|---|---|
| Reviewer | rdfs:subClassOf | Person |
| Faculty | rdfs:subClassOf | Reviewer |
| Student | rdfs:subClassOf | Reviewer |
| Ph.D. Student | rdfs:subClassOf | Student |
| ChairpersonOf | rdfs:domain | Person |
| ChairpersonOf | rdfs:range | Conference |
| ReviewerOf | rdfs:domain | Reviewer |
| ReviewerOf | rdfs:range | Conference |
| Age | rdfs:domain | Reviewer |
| Age | rdfs:range | xsd:int |
| EnrolledAt | rdfs:domain | student |
| EnrolledAt | rdfs:range | unversity |

Triples of RDF Schema 201

| Subject | Predicate | Object |
|---|---|---|
| ICDE 2005 | rdf:type | Conference |
| John | Age | 24 |
| John | rdf:type | Ph.D. student |
| John | ReviewerOf | ICDE 2005 |
| Mary | rdf:type | Faculty |
| Mary | ChairpersonOf | ICDE 2005 |
| Mary | Age | 29 |
| Tom | Age | 22 |
| Tom | rdf:type | Ph.D. student |
| Tom | ReviewerOf | ICDE 2005 |
| Gary | Age | 23 |
| Gary | rdf:type | Ph.D. student |
| Gary | ReviewerOf | VLDB 2005 |
| Bob | Age | 21 |
| Bob | rdf:type | Ph.D. student |
| Bob | ReviewerOf | VLDB 2005 |

Triples of RDF data 203

205 {
207(1) '(?r  ReviewerOf  ?c)
207(2) '(?r  rdf:type Ph.D. student)
207(3) '(?r  Age  ?a)',

FIG. 2 Prior Art

```
303  ('rb',                                              --rulebase name
305  'ChairpersonRule',                                  --rule name
307  '(?r  ChairPersonOf  ?c)',                          --LHS pattern    ⎫
308  NULL,                                               --filter condition ⎬ 310
311  '(?r  ReviewerOf  ?c)')                             --RHS pattern    ⎭
314  SEM_ALIASES (SEM_ALIAS ('', 'http://some.org/test/'))  --aliases
     )
```

RDF rule 301

'(?r    ReviewerOf   ?c)'

RDF pattern 312 that
requires rule 301

| RDF Schema 111 |
| RDF Schema 113 |

RDF model 101

| RDF rule base 319 |

| Other rule base 321 |

| Aliases 323 |

RDF data set 313

FIG. 3 Prior Art

| ModelId 503 | LinkId 504 | SubjectID 505 | PropertyID 507 | ObjectID 509 |
|---|---|---|---|---|
| ReviewersID | ICDE2005.... | ICDE2005ID | rdf:TypeID | ConferenceID |
| ReviewersID | JohnIDAgeID... | JohnID | AgeID | 24ID |
| ReviewersID | JohnIDrdf:... | JohnID | rdf:TypeID | PhDStudentID |
| ReviewersID | JohnIDRevi... | JohnID | ReviewerOfID | ICDE2005ID |
| ... | ... | ... | ... | ... |

511

IdTriples table 455

| 24 | <num. of row 521> |
|---|---| index entry 529 idx_num 527

| Internal ID 515 | RDFVal 517 | Canonical? 523 | Literal Type 525 |
|---|---|---|---|
| ICDE2005ID | <ICDE2005 URI> | y | URI |
| JohnID | <John_URI> | y | URI |
| AgeID | <Age_URI> | y | URI |
| 24ID | 24 | y | int |
| ... | ... | ... | ... |

520

521

Values table 451

FIG. 5

```
select distinct T2.SID sid, ID(rdf:type) pid, T1.OID oid
    from <IVIEW> T1, <IVIEW> T2         ←———— 801
where T1.PID=ID(rdfs:subClassOf)
    and T2.PID=ID(rdf:type) and T1.SID=T2.OID  ←—802
    and NOT EXISTS (select 1 from <IVIEW> m
              where m.SID-T2.SID and m.PID=ID(rdf:type)
                    and m.OID=T1.OID)
    ↗
803
```

FIG. 8

```
select T2.SID sid, ID(rdf:type) pid, T1.OID oid,     ←—901
        min(T1.LID ||' '|| T2.LID ||' : RDFS9') proof
    from <IVIEW> T1, <IVIEW> T2
where T1.PID=ID(rdfs:subClassOf)
    and T2.PID=ID(rdf:type) and T1.SID=T2.OID
    and NOT EXISTS (select 1 from <IVIEW> m
              where m.SID=T2.SID and m.PID=ID(rdf:type)
                    and m.OID=T1.OID)
  group by T2.SID, T1.OID
```

FIG. 9

```
select id SID, case when key = 1 then ID(rdf:type)
                   else ID(rdfs:subPropertyOf) end PID,
case when key = 1 then ID(rdfs:CMP)
                   else ID(rdfs:member) end OID
from (<subquery>),
(select 1 key from dual union all select 2 from dual)
```

FIG. 10

```
select distinct m1.sid, ID(owl:sameAs) pid, M2.oid oid
from <IVIEW> m1, <IVIEW> m2 where
   m1.pid=ID(owl:sameAs) and m2.pid=ID(owl:sameAs))
   and m1.oid = m2.sid and not exists (
        select 1 from <IVIEW> m where
        m.sid=m1.sid and m.pid=ID(owl:sameAs)
        and m.oid=m2.oid)
```

FIG. 11

```
select distinct m1.sid, ID(owl:sameAs) pid, M2.oid,
       <r> + 1 as distance
  from <IVIEW> m1, <IVIEW> m2 where
m1.pid = ID(owl:sameAs) and m2.pid = ID(owl:sameAs)
       and m1.oid = m2.sid
       and m1.distance = <r> and m2.distance = 1
       and not exists (select 1 from <IVIEW> m
  where m.sid=m1.sid and m.pid=ID(owl:sameAs)
       and m.oid=m2.oid)
```

FIG. 12

```
select distince m3.sid sid, m2.oid pid, m1.oid oid
 from <iview> m1, <iview> m2, <iview> m3
    where m1.pid = ID(owl:hasValue) and
          m2.pid = ID(owl:onProperty) and m3.pid = ID(rdf:type)
 and m1.sid = m2.sid and m1.sid = m3.oid
 and not exists (select 1 from <iview> m where
 m.sid = m3.sid and m.pid=m2.oid and m.oid=m1.oid)
```

FIG. 13

... and not exists (
    select 1 from <iview> m
    where m.sid=m3.sid and m.pid=m2.oid
        and m.pid in (select x.oid from <iview> x
            where x.pid=ID(owl:onProperty))
        and m.oid=m1.oid)

FIG. 14

DATABASE-BASED INFERENCE ENGINE FOR RDFS/OWL CONSTRUCTS

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention relates to inference engines, and more particularly to scalable inference engines for relational database systems.

2. Description of Related Art

The incremental evolution of the Web to a Semantic Web is gaining momentum. Resource Description Framework (RDF) is being widely adopted as a standard to capture the semantics of data. Facts represented as RDF (subject, predicate, object) triples can capture both relationships between resources as well as attribute values associated with a resource. This simple standard representation allows programs (agents) to automatically process data belonging to diverse independently developed applications and web pages. Also, the World Wide Web Consortium (W3C) has proposed ontology representation languages, Resource Description Framework Schema (RDFS) and Web Ontology Language (OWL), to capture domain knowledge. As more and more RDF(S)/OWL encoded data (hereafter referred to as semantic data) becomes available, semantic data stores are needed that support efficient storage, querying, and inference capabilities.

Challenge of Semantic Data Stores

A unique challenge of semantic data stores is the need to automatically derive additional facts based on semantics of RDFS/OWL constructs. Thus, inference engines are an integral part of semantic data stores. Supporting an inferencing capability is challenging for several reasons:

Expressiveness vs. Tractability tradeoffs: On one hand, we would like to have sufficiently expressive constructs to allow users to compactly capture domain knowledge. On the other hand, efficient reasoning is required.

Pre-known semantics vs. user-defined semantics expressed as rules: For RDFS and OWL constructs, since the semantics are known, it simplifies the task of developing the inference engine. However, user-defined semantics expressed as domain rules pose additional challenges, as a general-purpose rule translation mechanism needs to be implemented.

Scalability: The inference engine should be able to do inferencing on arbitrarily large knowledge bases, which rules out main memory based solutions. Another unique aspect of inferencing is that it could produce no additional triples or could produce millions of triples. The inference engine implementation should be able to adapt itself as amount of derived triples increases.

What is needed is a scalable rule-based inference engine that supports RDF and OWL, and is implemented in a relational database management system.

BRIEF SUMMARY OF THE INVENTION

A scalable rule-based inference engine that supports RDF and OWL is implemented in a relational database management system. In one aspect of the invention, a method for inferencing semantic data comprises: creating a new partition in a semantic data table in the relational database system; creating an exchange table and a temporary table in the relational database system, wherein the exchange table has a same structure as the semantic data table; executing on the semantic data table one or more inference rules for a semantic data model; adding into the temporary table any new inferred semantic data generated by the execution of the inference rules; copying the inferred semantic data in the temporary table into the exchange table; building one or more indexes for the exchange table, wherein the indexes for the exchange table are same as indexes for the semantic data table; and exchanging the indexed semantic data in the exchange table into the new partition in the semantic data table.

In one aspect, the temporary table is un-indexed. The use of an un-indexed temporary table avoids incremental index maintenance overhead, thus increasing the efficiency of the inferencing process.

In one aspect, the temporary table is partitioned based on a variable in the semantic data. For storing semantic data, the temporary table is partitioned by the predicate of the RDF triple. The temporary table stores only one copy of duplicate inferred semantic data. To determine if an inferred semantic data is a duplicate, only the partition in the temporary table that corresponds to a value of the variable is searched.

Optionally, the semantic data can include distance information. The distance is used in a calculation of a transitive closure (TC) in the execution of the inference rules to restrict each iteration of the transitive closure calculation to paths created in a previous iteration.

Optionally, the semantic data can include proof information. The proof information concerns a source of the newly inferred semantic data returned by the execution of the inference rules. The proof information can be used to track a derivation path for the inferred semantic data for identifying possible problems in the semantic data model.

BRIEF DESCRIPTION OF THE SEVERAL VIEWS OF THE DRAWINGS

FIG. 2 shows tables of RDF triples and an RDF pattern.

FIG. 3 shows an RDF rule and RDF information.

FIG. 5 shows the RDF triples tables.

FIG. 8 shows a translation of an RDF rule into SQL.

FIG. 9 shows an example SQL query with a min aggregate function used in the execution of an inference rule.

FIG. 10 shows an example SQL query for inference rules with multiple consequents.

FIG. 11 shows an example SQL query for naïve procedural TC implementation.

FIG. 12 shows an example SQL query for distance-based TC calculation.

FIG. 13 shows an example SQL query implementing rule RDFP14bx.

FIG. 14 shows an example optimized sub query for RDFP14bx.

DETAILED DESCRIPTION OF THE INVENTION

The following Detailed description will first present an overview of RDF and OWL, then an overview of the inference engine as embodied in a standard relational database management system (RDBMS). Details of an embodiment of the invention are then presented.

RDF Overview

RDF is a language that was originally developed for representing information (metadata) about resources in the World Wide Web and their relationships. It may, however, be used for representing information about absolutely anything. When information has been specified using the generic RDF format, it may be automatically consumed by a diverse set of applications.

Figure 1:
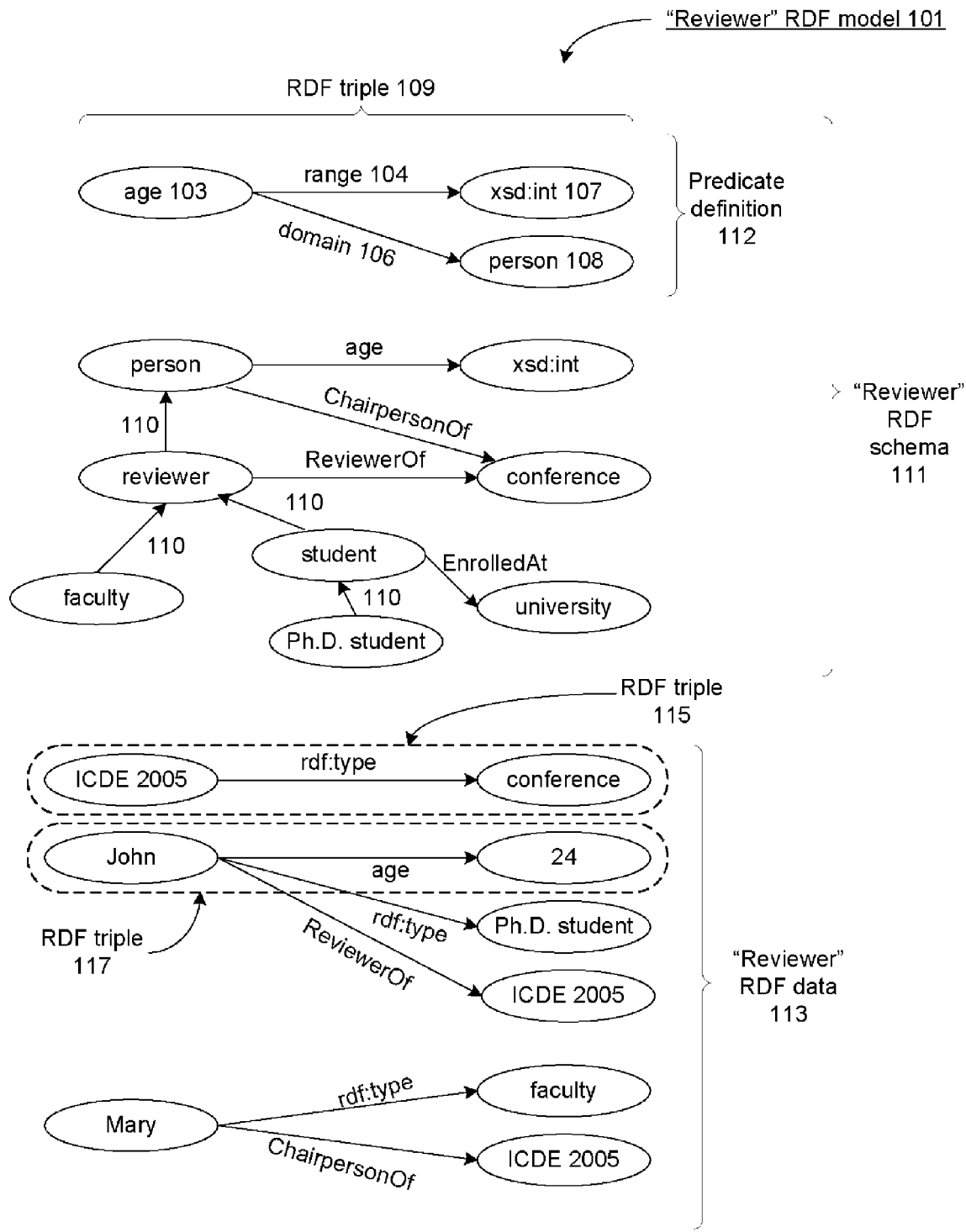
FIG. 1 shows RDF triples as graphs.

FIGS. 1-3 provide an overview of RDF. Assertions (or statements) in RDF are represented by RDF triples. Each RDF triple represents a fact and is made up of three parts, a subject, a predicate, (sometimes termed a property), and an object. For example, the fact represented by the English sentence "John is 24 years old" is represented in RDF by the subject, predicate, object triple <'John', 'age', '24'>, with 'John' being the subject, 'age' being the predicate, and '24' being the object. The values of subjects and objects ultimately resolve to universal resource identifiers (URIs) or are denoted using a blank node. A URI denotes a named resource whereas a blank node represents the existence of an unnamed resource. Predicates are denoted using URIs. In addition to URIs, the values of objects may be literal values such as numbers or character strings. The interpretations given to the members of the triple are determined by the application consuming the triple.

RDF triples may be represented as a graph as shown at 109 in FIG. 1. The subject is represented by a node 103, the object by another node 107, and the predicate by arrow 104 connecting the subject node 103 to the object node 107. A subject may of course be related to more than one object, as shown with regard to "Person" 108. Each entity in an RDF triple is represented by a URI or a literal value. For example, the subject "John" is identified by the URI for his contact information. In RDF triple 117, the value of John's age is the literal value 24. In the following general discussion of RDF, the URIs will be replaced by the names of the entities they represent. For a complete description of RDF, please see the formal specification for RDF, available in July 2008 at http://www.w3.org/TR/rdf-syntax-grammar/. The formal specification is hereby incorporated by reference into the present patent application.

An RDF representation of a set of facts is termed in the following an RDF model. A simple RDF model Reviewers is shown at 101 in FIG. 1. The model has two parts: RDF data 113 and RDF schema 111. RDF schema 111 is made up of RDF triples that provide the definitions needed to interpret the triples of RDF data 113. Schema triples define classes of entities and predicates which relate classes of entities. A property definition for the predicate age is shown at 112. As shown there, a predicate definition consists of two RDF triples for which the predicate is the subject. One of the triples, which has the built-in domain predicate 106, indicates what kind of entities must be subjects for the predicate. Here, it is entities belonging to the class person 108. The other triple indicates what kinds of entities must be objects of the predicate; here, it is values of an integer type called xsd:int 107. Schema 111 uses the SubclassOf predicate 110 to define a number of subclasses of entities belonging to the class person. Also defined are conference and university classes of entities, together with predicates that relate these entities to each other. Thus, an entity of class person may be a chairperson of a conference and an entity of class reviewer may be a reviewer for a conference. The nodes person and Conference, connected by the edge ChairpersonOf is a shorthand for a domain range predicate definition, similar to definition 112. This part of the diagram indicates the triples <ChairpersonOf>, <rdf:domain>, <person> and <ChairpersonOf>, <rdfs:range>, <Conference>. Also belonging to Schema 111 but not shown there is the built-in RDF predicate rdf:type. This predicate defines the subject of a triple that includes the rdf:type predicate as an instance of the class indicated by the object. As will be explained in more detail below with reference to FIG. 3, RDF rules determine logical relationships between classes. For example, a built-in RDF rule states that the SubclassOf relationship is transitive: if A is a subclass of B and B a subclass of C, then A is a subclass of C. Thus, the class faculty is a subclass of person.

The data triples to which schema 111 applies are shown at 113; they have the general pattern <individual entity>, <predicate>, <object>. Thus, triple 115 indicates that ICDE 2005 is an entity characterized as belonging to the class CONFERENCE and triple 117 indicates that John is characterized by having the age 24. Thus, RDF data 113 contains the following triples about John:

John has an Age of 24;
John belongs to the class Ph.D.Student;
John is a ReviewerOf ICDE 2005.

None of these triples states that John is a Person; however, the fact that he is a Person and a Reviewer is inferred from the fact that he is stated to be a Ph.D.Student, which is defined in schema 111 as a subclass of both Person and Reviewer. Because the SubclassOf predicate is transitive, the fact that John is a Ph.D Student means that he is a potential subject of the Age and ReviewerOf properties.

For purposes of the present discussion, RDF models are best represented as lists of RDF triples instead of graphs. FIG. 2 shows a table of triples 201 which lists triples making up schema 111 and a table of triples 203 which includes all triples making up RDF data 113. At the bottom of FIG. 2 is an RDF Pattern 205. An RDF pattern is a construct which is used to query RDF triples. There are many different ways of expressing RDF patterns; what follows is a typical example. When RDF pattern 205 is applied to RDF model 101, it will return a subgraph of RDF model 101 which includes all of the reviewers of conference papers who are Ph.D students. The pattern is made up of one or more patterns 207 for RDF triples followed by an optional filter which further restricts the RDF triples identified by the pattern. The identifiers beginning with ? are variables that represent values in the triples belonging to the subgraph specified by the RDF pattern. Thus, the first pattern 207(1) specifies every Reviewer for every Conference indicated in the RDF data 203; the second pattern 207(2) specifies every Reviewer who belongs to the subclass Ph.D.Student, and the third pattern 207(3) specifies every Person for which an Age is specified. The result of the application of these three patterns to RDF data 203 is the intersection of the sets of persons specified by each of the patterns, that is, the intersection of the set of reviewers and the set of Ph.D. Students of any age. The intersection is John, Tom, Gary, and Bob, who are indicated by the triples in data 203 as being both Ph.D. students and reviewers.

The manner in which entities in an RDF model relate to each other can be modified by applying RDF rules. An example RDF rule is shown at 301 in FIG. 3. Rule 301 is contained in a rulebase which, as shown at 303, has the name rb. The rule has a name, chairpersonRule, which is shown at 305. The rule specifies how the class of Persons who are conference chairpersons relates to the class of Reviewers for the conference. Rule body 310 has a left-hand side 307 specifying the rule's antecedent and a right-hand side 311 specifying the rule's consequent. The rule states that if an entity satisfies the conditions established for the left-hand side 307

(the antecedent), it also satisfies the conditions established for the right-hand side 311 (the consequent). The antecedent and the consequent are specified by RDF patterns. The RDF pattern for left-hand side 307 specifies any Person (?r) in the model who is a chairperson of any Conference (?c) in the model; the RDF pattern for right-hand side 311 specifies that any such person is also a reviewer for that conference. The rule includes an optional filter condition 308 that further restricts the subgraphs matched by the antecedent. In this case, the rule 301 does not have a filter condition, so that component is NULL. The aliases 314 of the rule specify one or more namespaces to be used for expanding abbreviated URIs that may be used in the antecedent or consequent patterns.

RDF pattern 312 shows the effect of rule 301. The pattern's triple specifies RDF triples which have the ReviewerOf predicate. Without rule 301, the pattern returns the subjects of those triples for ?r, or John, Tom, Gary, and Bob. The problem with this is that Mary is also a reviewer by virtue of rule 301; consequently, when the rule is taken into account, the triples include not only those with the ReviewerOf predicate, but those that have the ChairpersonOf predicate, and that adds Mary to the list of subjects for ?r. An RDF model 101 and the rules and other information required to interpret the model are termed as an RDF dataset. Components of an RDF data set are shown at 313 in FIG. 3. The components include RDF model 101, with its schema 111 and RDF data 113, one or more rulebases containing rules relevant to the model, and a list of optional aliases 323, which relate names used in the model to longer designations.

The rulebases include an RDFS rulebase 319 which is a set of rules which apply to all RDF models. An example of the rules in this rulebase is the rule that states that an entity which belongs to a subclasss of a class also belongs to the class, for example, that as a member of the class Ph.D.Student, John is also a member of the class Person. In addition, rules may be defined for a particular RDF model. Rule 301 is an example of such a rule. These rules are contained in one or more other rule bases 321. Aliases 323 relate short names used in a model to the URIs that completely identify the short name. For example, John, Mary, Tom, Gary, and Bob are all subjects and must therefore be identified by URIs. Aliases 323 will include a list of alias that relates each name to its corresponding URI.

OWL Overview

OWL is a family of knowledge representation languages for authoring ontologies. OWL is designed for use by applications that need to process the content of information instead of just presenting information to humans. OWL facilitates greater machine interpretability of Web content than that supported by XML, RDF, and RDFS by providing additional vocabulary along with formal semantics. OWL includes three sub-languages: OWL Lite, OWL DL, and OWL Full.

OWL Lite supports those users primarily needing a classification hierarchy and simple constraints. For example, while it supports cardinality constraints, it only permits cardinality values of 0 or 1.

OWL DL supports those users who want the maximum expressiveness while retaining computational completeness (all conclusions are guaranteed to be computable) and decidability (all computations will finish in finite time). OWL DL includes all OWL language constructs, but they can be used only under certain restrictions (for example, while a class may be a subclass of many classes, a class cannot be an instance of another class). OWL DL is so named due to its correspondence with description logics, a family of logics that form the formal foundation of OWL.

OWL Full is meant for users who want maximum expressiveness and the syntactic freedom of RDF with no computational guarantees. For example, in OWL Full a class can be treated simultaneously as a collection of individuals and as an individual in its own right. OWL Full allows an ontology to augment the meaning of the pre-defined (RDF or OWL) vocabulary. It is unlikely that any reasoning software will be able to support complete reasoning for every feature of OWL Full.

Figure 4:
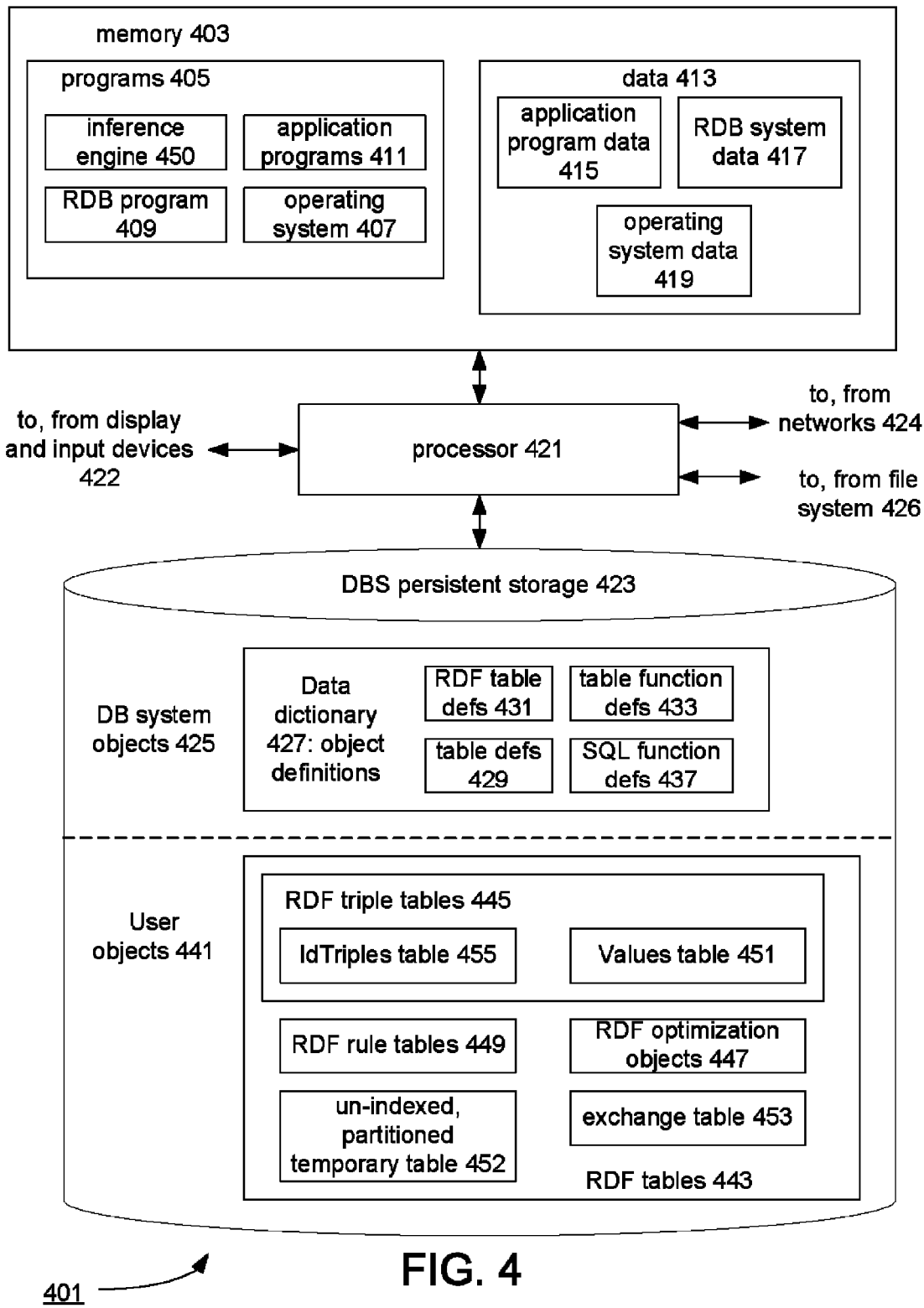
FIG. 4 provides an overview of a relational database management system in which the invention is implemented.

A complete description of OWL may be found in OWL Semantics, published by W3C and available in July 2008 at www.w3.org/TR/owl-semantics/. The OWL Semantics is hereby incorporated by reference into the present patent application Overview of a RDBMS in which the invention is Implemented: FIG. 4

FIG. 4 is a functional block diagram of a relational database management system (RDBMS) 401 in which the invention is implemented. RDBMS's are characterized by the fact that the information they contain is organized into tables having rows and named columns. A row of data establishes a relationship between the items of data in the row and the Structured Query Language (SQL) uses the relationships thus established to locate information in the tables. RDBMS system 401 may be any relational database system which employs a variant of the SQL language.

The main components of RDBMS system 401 are a processor 421, memory 403 or storage media, which contains data and programs accessible to the processor, and persistent storage 423, which contains the information organized by system 401. Processor 421 further can provide information to and receive information from display and input devices 422, can provide information to and receive information from networks 424, and can provide information to and receive information from file system 426. RDBMS system 401 is created by processor 421 as it executes programs in memory 403 using data contained in memory. The programs 405 typically include an operating system 407, which manages the resources used by RDBMS 401, relational database program 409, which interprets the SQL language, and application programs 411, which provide queries to RDB program 409. Data 413 used by these programs includes operating system data 419, used by the operating system 407, RDBMS data 417 used by RDB program 409, and application program data 415, used by application programs 411.

The information which RDB program 409 maintains in persistent storage 423 is stored as objects that RDBMS system 401 is able to manipulate. Among the objects are fields, rows, and columns in the tables, the tables themselves, indexes to the tables, and functions written in the SQL language. The objects fall into two broad classes: user-defined objects 441, which are defined by users of the RDBMS, and system-defined objects 425, which are defined by the system. RDBMS 401 maintains definitions of all of the objects in the database system in data dictionary 427, which is part of DB system objects 425. The definitions in data dictionary 427 include: table definitions 429, which include definitions 431 of RDF tables 443; table function definitions 433, which define table functions, including those that permit use of RDF patterns to query RDF models in RDBMS 401; and SQL function definitions 437, including those that take RDF triples and make them into RDF tables 443.

User objects 441 include RDF tables 443, which are tables in RDBMS 401 that are made from the information contained in RDF information 313. These tables fall into three groups: RDF triple tables 445, which represent the triples making up one or more RDF models; RDF rule tables 449, which contain the rule bases belonging to RDF information 313; and RDF optimization objects 447, which are tables and other objects which are used to speed up queries on the RDF models represented by RDF triple tables 445 and the RDF rules in rules tables 449. The RDF triples table 445 is partitioned based on RDF model ID.

FIG. 5 shows the RDF triples tables 445 in which the data for an RDF model is stored after normalization. There are two main tables: IdTriples 455, which is a list of models and their RDF triples, as represented by internal identifiers for the URIs and literals making up the triple, and Values table 451, which maps URIs and literals to the internal identifiers and thus permits conversions between the URIs and literals and the internal identifiers. This arrangement saves storage space and increases efficiency by permitting the URIs, which are often lengthy, and the literals, which are also often lengthy and may further have a variety of types, to be replaced in IdTriples table 455 by internal identifiers having a single type and size.

Continuing in detail with IdTriples table 455, this table has a row 511 for every RDF triple in the RDF models that have been loaded into RDBMS 401. The table has five major columns:

ModelID 503, which contains the internal identifier of the model to which the RDF triple belongs. In this embodiment, the IdTriples table 455 is partitioned based on ModelID 503;

LinkID 504, which stores a system-generated unique ID of each triple for ease reference. In this embodiment, the LinkID is a catenation of the SubjectID 505, the PropertyID 507, and the ObjectID 509;

SubjectID 505, which contains the internal identifier for the RDF triple's subject;

PropertyID 507, which contains the internal identifier for the RDF triple's predicate; and ObjectID 509, which contains the internal identifier of the RDF triple's object.

As shown in FIG. 5, IdTriples table 455 shows the rows for the first four data triples of data triples 203. The IdTriples table 455 contains a row for every schema triple in table 201 and every data triple in table 203. For brevity, ModelID, LinkID, SubjectID, PropertyID, and ObjectID will be referred to as MID, LID, SID, PID, OID, respectively.

Values table 451 has a single row 520 for every internal identifier which appears in IdTriples table 455. There are four major columns:

InternalID 515, which contains the internal ID;

RDFVal 517, which specifies a URI or literal value corresponding to the internal ID;

a flag 523 which indicates whether the value of RDFval 517 is the canonical form for the value; and the type 525 of RDFVal 517.

Types include URIs, strings, and integers. The canonical form for a value is a standard form for writing the value. For example, the numeric value 24 may be written as 024, 24.00, $2.4 \times 10^1$, and so on. Depending on the application, any of these may be a canonical form. In a preferred embodiment, the form the value has when the first entry is made for the value in Values table 451 is treated as the canonical value. There is further an index, idx_num 527, that indexes a given numerical value to a row in Values table 455 that contains the canonical representation. A function ID(lex) is defined that takes a lexical value as input and returns its integer ID.

The IdTriples table 455 is partitioned so that each partition corresponds to one semantic data model or one inferred data model. The partition is based on integer column MID that has a unique value for each semantic data model or inferred semantic data model.

Inferencing Engine 450

Returning to FIG. 4, the system 401 further includes the inference engine 450, which is implemented as a database application. The inference engine 450 comprises code that when executed by the processor 421, executes inference rules for an RDF model on the data in the IdTriples table 455. Any newly created triples resulting from execution of the inference rules are ultimately stored in the IdTriples table 455. The inference rules were extracted from RDF and OWL constructs in the RDF model.

The inference engine 450 uses the following tables: an un-indexed, partitioned temporary table 452, which stores newly inferred triples; and an exchange table 453, which stores indexed triples from the temporary table 452 in preparation for copying into the corresponding partition(s) in the IdTriples table 455. There are other ancillary columns in table IdTriples table 455, as well as the temporary table 452 and the exchange table 453, including PROOF of type string and DISTANCE of type integer. The DISTANCE information is used in transitive closure calculation. PROOF contains information concerning the source of the consequence returned, and can be used to track the derivation path for the consequence for identifying possible problems in an ontology. These two columns will optionally be populated in inferred data models. The inference engine 450, and its use of the temporary table 452, exchange table 453, and inference rules table 454, will be described in detail later in this specification.

Inferencing Requirements

The inference engine 450 satisfies the following requirements:

Basic Inferencing Requirements. Basic inferencing requirements can be classified into three groups as described below.

RDFS Constructs. The RDFS inference can be done by implementing the standards-defined two RDF rules and the 14 RDFS rules. These rules can be found at www.w3.org/TR/rdf-mt/ and is hereby incorporated by reference into the present application.

OWL Constructs. In order to build a practical, efficient and scalable solution, suitable subsets of OWL constructs from the complete OWL DL vocabulary are selected for implementation. A major subset is OWLPrime which consists of the following OWL constructs (namespaces omitted for brevity): sameAs, differentFrom, disjointWith, complementOf, hasValue, equivalentProperty, equivalentClass, inverseOf, (Inverse)FunctionalProperty, TransitiveProperty, SymmetricProperty, someValuesFrom, allValuesFrom, and the usual RDFS vocabulary including subClassOf, subPropertyOf, range, domain, etc. The OWL constructs missing from OWLPrime, such as min/maxCardinality, oneOf, unionOf, and intersectionOf, limit its applicability for some applications; however, this limitation is not deemed significant for most applications. From the OWLPrime vocabulary are extracted approximately 50 inference rules that capture the semantics of the corresponding language constructs.

User-defined Rules. A user-defined rule has three components: antecedent pattern (optional), filter condition (optional), and consequent pattern. A rule fires when its antecedent pattern and filter condition are both satisfied. The antecedent pattern specifies a subgraph to match in the data model, and the filter condition specifies a boolean condition (typically involving variables from the antecedent) to satisfy. The consequent pattern describes the triples to generate when the rule is fired. A rule without an antecedent is useful for defining axioms that are always true.

The consequent pattern can include fixed URIs and literals, and variables from the antecedent, but there is no mechanism that allows a rule to generate new URIs or literals that are not specified in the rule. Thus arbitrarily complex sets of user-defined rules are allowed, and it can be guaranteed that they will generate a finite number of new triples and terminate in finite time.

Requirement for Ancillary Information. Ancillary information about inferred triples are generated. Given an ontology, one may want to find not only whether a class C1 is a subclass of another class C2 but also the proximity of the two classes assuming C1 is a, direct or indirect, subclass of C2. Intuitively, the proximity between two classes can be measured using the distance between them in a tree-like hierarchical class subsumption structure. An option can be provided to generate distance information during inference.

Further, an option to generate proof is provided to allow users to diagnose unexpected inference rules. The proof can be a list of triples used to derive each inferred triple.

Requirement for Validation. Given an arbitrary ontology, there might be inconsistencies and errors embedded. For example, the assertions (:X owl:sameAs :Y) and (:X owl:differentFrom :Y) contradict each other. Therefore an API to detect inconsistencies is provided, where inconsistencies are detected by running SQL queries.

Miscellaneous Requirements.

Generate only new triples. For efficiency consideration, an inferred data model generated by the system shall not have any overlap with the original source data models.

Support both RDFS/OWL inference and user-defined rule inference. Although OWLPrime is expressive enough for many applications, it may be necessary to support inference of a combination of predefined RDFS/OWL semantics and ad-hoc user-defined rules.

Capabilities of Rule-Based Inference Engine 450

This section gives an overview of the capabilities provided by the inference engine 450:

The RDFS/OWL Entailment. A PL/SQL API named CREATE_ENTAILMENT is provided to perform inference against a set of semantic models and a set of rulebases. The CREATE_ENTAILMENT procedure creates a rules index (entailment) that can be used to perform OWL or RDFS inferencing, and optionally use user-defined rules. Intuitively, entailment means that the inferred data is a logical consequence of the input semantic models. The CREATE_ENTAILMENT procedure takes as input parameters: a name of the rules index to be created; one or more model names; one or more rulebase names; the number of rounds that the inference engine should run; a comma-delimited string of keywords representing inference components, for performing selective or component-based inferencing; and a comma-delimited string of options to control the inference process by overriding the default inference behavior. Also, there are options to enable generation of ancillary information such as DISTANCE or PROOF.

User-defined Rules Entailment. Rules are grouped into rulebases for manageability and stored in the RDF rule tables 449. For each rulebase there is a view that contains one row for each rule in the rulebase. The user can insert, delete, or update rules in the rulebase by performing DML against this view. For example, the following inserts a rule that classifies people 18 years old or older as an adult:

```
INSERT INTO <RULEBASE_VIEW> VALUES(
   'adult_rule',                        -- rule name
   '(?x rdf:type :person) (?x :age ?a)',  -- antecedent
   'a >= 18',                           -- filter
   '(?x rdf:type :adult)',              -- consequent
   ...);                                -- namespace [omitted]
```

Semantic Data Validation. PL/SQL APIs named VALIDATE_ENTAILMENT and VALIDATE_MODEL are provided to find conflicts or errors in a set of models and inferred models. The VALIDATE_ENTAILMENT procedure validates original graph and rules indexes (entailments) that result from OWL or RDFS inferencing for one or more models. The VALIDATE_ENTAILMENT procedure takes as input parameters: one or more model names; one or more rulebase names; a comma-delimited string of validation checks to run; and a maximum number of conflicts to find before the validation process stops. This procedure returns a null value if no errors are detected. If errors are detected, an object identifying the errors is returned. The VALIDATE_MODEL procedure validates one or more models. The VALIDATE_MODEL procedure takes as input parameters: one or more model names; a comma-delimited string of validation checks to run; and a maximum number of conflicts to find before the validation process stops. This procedure returns a null value if no errors are detected. If errors are detected, an object identifying the errors is returned.

Flow of Inference Process Implemented by Inference Engine 450

Figure 6:
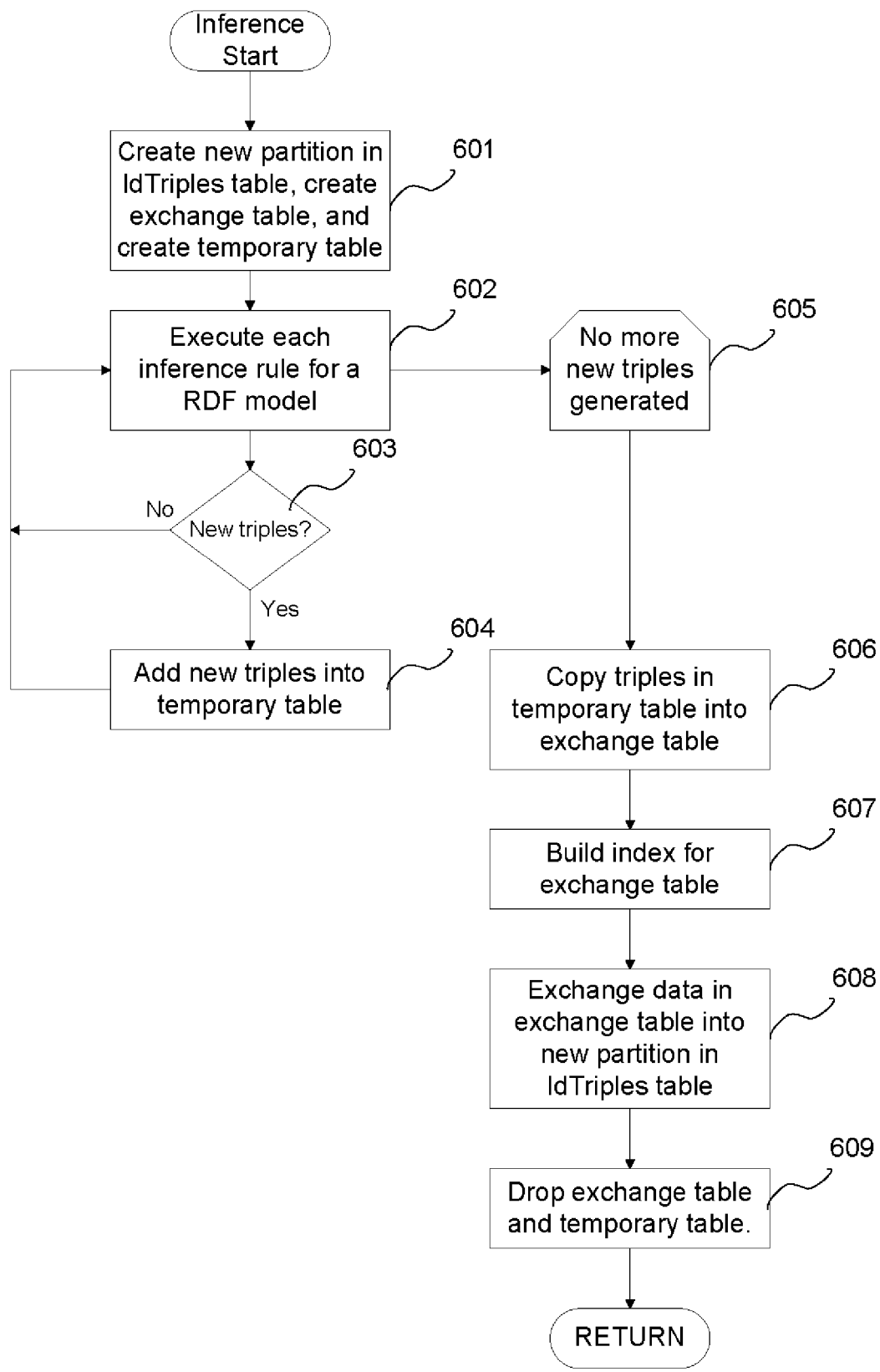
FIG. 6 is a flowchart illustrating an embodiment of an inference process.

FIG. 6 is a flowchart illustrating an embodiment of an inference process implemented by the inference engine 450. The inference engine 450 adopts a forward-chaining strategy. The inference result set is fully materialized in order to support arbitrary graph queries over the original and inferred data. The inference engine 450 starts with the creation of a new partition in IdTriples table 455 and with the creation of an exchange table 453 and a temporary table 452 to hold new triples to be inferred (step 601). The exchange table 453 has the same structure as the IdTriples table 455. The temporary table 452 is un-indexed and partitioned, preferably based on PID. This temporary table 452 has at least three columns SID, PID and OID that together represent a triple. When ancillary information generation option is selected in a CREATE_ENTAILMENT procedure call, the temporary table 452 will have additional DISTANCE and/or PROOF columns.

The core inference logic is driven by a set of inference rules. Each rule is executed (fired) during inference, one at a time (step 602). If new (previously nonexistent) triples are generated by an inference rule (step 603), these new triples are added into the temporary table 452 (step 604). Thus, recursive rules, or rules that are involved in a dependency graph cycle, are handled correctly because triples that are already in the temporary table 452 are filtered out. In one pass, all rules will be examined. When the rules no longer generate any new triples (step 605), the inference process copies the triples in the temporary table 452 into the exchange table 453 (step 606), builds index(es) for the exchange table 453 (step 607), and exchanges the exchange table 453 with the newly created table partition in IdTriples table 455 (step 608). The exchange operation is a virtually zero-time operation because it involves only updating metadata of the tables. The exchange table 453 and the temporary table 452 are then dropped (step 609).

Figure 7:
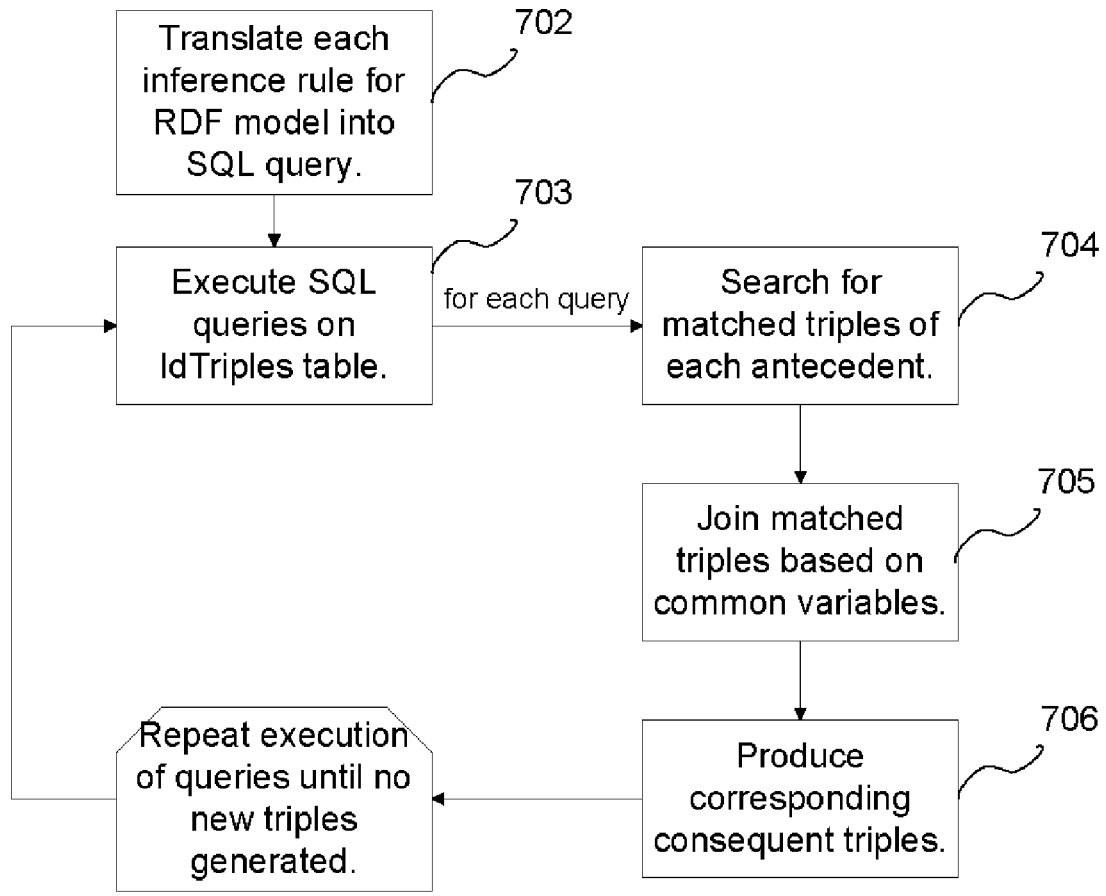
FIG. 7 is a flowchart illustrating the execution of the inference rules.

FIG. 7 is a flowchart illustrating the execution of an inference rule. Each inference rule for a RDF model are translated into a SQL query (step 702). The SQL queries are executed on the IdTriples table 455 (step 703). The execution of the SQL queries involve a search for matched triples of each antecedent (step 704). The matched triples are joined based on common variables (step 705) to produce corresponding consequent triples (step 706). Each inference rule is executed once per pass over all the rules. Passes are repeatedly made until no new triples are generated.

Take the RDF rule named RDFS9 for example. This rule expresses the semantics that an instance of a sub class is also an instance of a super class. Variable U is a shared variable between the two antecedents.

$$\begin{array}{l} U\ rdfs{:}subClassOfX. \\ V\ rdf{:}typeU. \end{array} \rightarrow V\ rdf{:}typeX.$$

A translation of the above rule into SQL is shown in FIG. 8. The presence of two antecedent patterns translates to a 2-way self-join on <IVIEW> (801), which is an inline view representing the union of the specified semantic data model(s) and the temporary table 452. The single common variable U that connects the two triple patterns in the antecedent gives us the join condition T1.SID=T2.OID (802). The NOT EXISTS clause (803) filters out triples already present in <IVIEW>.

The SELECT list is formed based upon the triple pattern in the consequent of the rule. The triples returned by the SELECT statement are inserted using an INSERT AS SELECT (not shown in FIG. 8) into the temporary table 452. ID( ) function invocations will be replaced with the actual integer IDs from the Values table 451 to avoid execution time overhead.

To generate ancillary proof for inferred results, the source triple information is kept along with consequents that are returned. Using the same rule RDFS9 for example, the proof of a generated triple (V rdf:type X) consists of link Ids (LID) of triple (U rdfs:subClassOf X) and triple (V rdf:type U), plus the rule name. There might be multiple paths to reach an inferred triple, but only one path is kept by using a min aggregate function 901 shown in FIG. 9. In general, if there are a number of n antecedents in a rule, the corresponding proof will have n link Ids.

Ancillary distance information is generated as part of transitive closure calculation, and will be described later in this specification.

Use Un-Indexed, Partitioned Temporary Table. An un-indexed, temporary table 452 is used to increase the efficiency of the inference process. Inferred triples are finally stored in the newly created partition of the IdTriples table 455 (step 607 of FIG. 6). The IdTriples table 455 is indexed for query efficiency. However, if inferred new triples are directly inserted into the IdTriples table 455, the DMLs against such an indexed table will incur incremental index maintenance overhead. So instead of directly inserting the inferred new triples into the IdTriples table 455, they are inserted into an un-indexed temporary table 452. Here, the temporary table 452 is partitioned by predicate. Partitioning by predicate is based on the observation that ontologies typically have a small set of unique predicates. Since the temporary table 452 is un-indexed, if the temporary table 452 is not partitioned, then a self-join of the full table would be required to run a query. By partitioning the temporary table by predicate, only joins of the relevant partitions of the temporary table 452 that correspond to the predicates specified in the query are required. Self-joins of the full temporary table are avoided.

Use of Exchange Table. The exchange table 453 has the same structure as the IdTriples table 455. An un-indexed temporary table 452 is used as described above to avoid the incremental index maintenance overhead. However, the structure of the un-indexed temporary table 452 is different than the IdTriples table 455. The IdTriples table 455 contains additional columns that are not relevant to the inference process. Thus, to ensure that the data exchanged into the IdTriples table 455 has the same columns, column definitions, and indexes, the data in the temporary table 452 is first copied into the exchange table 453, and then indexes that are the same as the indexes in the IdTriples table 455 are built for the exchange table 453. The indexed data in the exchange table 453 are then exchanged into the new partition in the IdTriples table 455.

Implementation of Inference Rules

In order to execute a set of inference rules, the rules are first translated into SQL statements. A query optimizer of the RDB program 409 chooses efficient execution plans for the SQL statements implementing the inference rules using up-to-date statistics collected from relevant tables and indexes.

Rule to SQL translation are classified into two cases:

Hand translation for RDFS/OWL constructs. Once the rules for RDFS/OWL constructs are extracted, their corresponding SQL statements can be handcrafted. The advantage of manual translation is that it is easy to optimize (both in terms of SQL structure and adding hints for the optimizer) the generated SQL without affecting others. The hand-written SQL statements have similar structure as the one shown in FIGS. 8-9. Detailed optimizations are described in the following section.

Automatic translation for user-defined rules. User-defined rules can be divided into three categories, 1) axioms are rules that have no antecedent, 2) 1-shot rules have an antecedent, but no variables in the consequent, and 3) general rules have an antecedent and have variables in the consequent.

Axioms are translated to a set of single-row INSERT . . . VALUES( . . . ) statements that are run only once at the beginning of the inference process. 1-shot and general rules are translated to INSERT . . . SELECT statements, with a SELECT part of the form shown in FIG. 8. A distinction is made between these two classes of rules because 1-shot rules can be discarded after they fire (if fired again they wouldn't produce new triples) while general rules need to be reconsidered during each iteration over the rules.

Optimization of Generated SQL

Pivoting for rules with multiple consequents. RDFS axiomatic triples contain assertions of the form rdf:_n rdf:type rdfs:CMP. (Here n is a positive integer and rdfs:CMP is a shorthand for rdfs:Container-MembershipProperty.) Rule RDFS12 dictates further the following.

u rdf:type rdfs:CMP

→u rdfs:subPropertyOf rdfs:member.

Essentially, for each URI rdf:_n that exists in one of the semantic data models, two corresponding consequents or two triples need to be inferred: (rdf:_n rdf:type rdfs:CMP) and (rdf:_n rdfs:subPropertyOf rdfs:member).

A straightforward implementation is to separate this task into two subtasks with each subtask containing just one consequent. This would involve two separate SQL queries however. A more efficient solution is to use a pivot table with a single column containing two rows with integer values 1 and 2, which is Cartesian joined with a query that finds all URIs in the form of rdf:_n to produce pairs like (rdf:_n 1), (rdf:_n 2) and a case expression (FIG. 10) that converts them into (rdf:_n rdf:type rdfs:CMP) and (rdf:_n rdfs:subPropertyOf rdfs:member), respectively. Use of the pivot table creates the multiple consequents according to the inference rules without requiring additional table joins, as would be required with separate SQL queries.

The omitted <subquery> is an inline view of a simple lookup query to find out URIs in the form of rdf:_n (assuming only URIs of that form can be typed as rdfs:CMP). The above scheme to an inference of rules can be extended with more than two consequents.

Dynamic statistics collection. Table and index statistics have to be kept up-to-date in order to provide meaningful guidance for the SQL optimizer. One simple strategy is to collect statistics after each rule is fired, or after each round of rules execution. However, statistics collection itself takes time and resources, so it should only be done when necessary. A dynamic scheme is adopted in system 401 that collects statistics when a significant number of new triples have been generated.

Transitive Closure: procedural implementation versus hierarchical query. Calculation of transitive closure (TC) is an important aspect in logical inference. Typical transitive relationships in RDFS and OWL include rdfs:subClassOf, rdfs:subPropertyOf, owl:sameAs, and all other explicitly-defined properties belonging to class owl:TransitiveProperty. Note that only one transitive property, owl:sameAs, is used in our examples and explanations. The algorithms are nevertheless applicable to all transitive properties.

Operator CONNECT BY based hierarchical queries may be used for this task with small ontologies. However, these hierarchical queries explore all possible paths between any two given nodes whereas only one path is needed for inference. Thus, hierarchical queries are inefficient for larger ontologies.

For larger ontologies, procedural algorithms are used to calculate a TC inside a database. The system 401 uses an algorithm that is based on the semi-naïve algorithm because i) it is simple, ii) the join cost can be smaller compared to smart algorithms, although the number of iterations can be bigger, and iii) it is easy to add an incremental maintenance of TC given new triples. Alternatively, a hybrid approach involving choosing between the seminaïve and the smart algorithm at different iterations can be used. Procedural, semi-naïve, and smart algorithms are further described in Y. E. Ioannidis, "On the Computation of the Transitive Closure of Relational Operators", in Proc. 12$^{th}$ *Int. Conf. Very Large Data Bases*, Kyoto, Japan, August 1986, 403-411.

For comparison purposes, an implementation of one naïve algorithm for calculating TC is described. The implementation simply performs a two way self-join of an inline-view <IVIEW> of the union of semantic data models and the temporary table 452. New triples are inserted into the temporary table 452 and this process is repeated until no new triple is generated. The SQL query in FIG. 11 captures this idea.

The naïve algorithm is, however, not quite efficient because that SQL involves a join of the complete set of owl:sameAs triples with itself.

Following the semi-naïve algorithm, we only want to join existing set of owl:sameAs triples with newly generated owl:sameAs triples for TC calculation. To help identify new triples, reduce join cost, and maintain TC incrementally, an additional piece of information, DISTANCE, is kept with each triple distance(x, y) is defined as the length of a shortest path between two nodes x and y. Another temporary table, partitioned based on distance, is used to assist in the calculation of TC.

In the first round of TC, all owl:sameAs triples in the original semantic data models are assigned a distance of 1. Two owl:sameAs triples that both have a distance of 1 are joined. New triples are then added to the temporary table and they have distance of 2. In general, in the r'th round, triples of distance r and 1 are joined. Newly generated triples will have a distance of r+1 assigned.

Once the above algorithm finishes, a TC is reached. The data in the temporary table are appended into the unindexed-partitioned temporary table 452. It is easy to prove that a closure will be reached after P rounds, assuming P is the length of a cycle-free longest path. There is no need to rerun the algorithm unless later there are new owl:sameAs triples generated by another rule. In that case, the newly generated owl:sameAs triples will have a distance of 1 assigned and the algorithm used is one that updates the TC by generating new owl:sameAs triples that are not already in the TC. The SQL in FIG. 12 implements the above algorithm. <r> is an integer to be filled in at runtime. Essentially, the setting of <r> helps to eliminate paths from the result set which have already been materialized in the temporary table, by restricting each iteration to joins that involve paths that were created in the previous iteration.

Leveraging application-level semantics. With additional knowledge of application-level semantics, queries can be written in a way to allow more efficient execution. A typical example is illustrated using rule RDFP14bx:

$$V owl:hasValue W.$$
$$V owl:onProperty p. \rightarrow U p W.$$
$$U rdf:type V.$$

A straightforward implementation of the inference process shown in FIG. 6 gives the following SQL.

```
select distinct m3.sid sid, m2.oid pid, m1.oid oid
from <iview> m1,<iview> m2,<iview> m3
    where m1.pid = ID(owl:hasValue) and
        m2.pid = ID(owl:onProperty) and m3.pid = ID(rdf:type)
    and m1.sid = m2.sid and m1.sid = m3.oid
    and not exists (select 1 from <iview> m where
    m.sid=m3.sid and m.pid=m2.oid and m.oid=m1.oid)
```

Unlike the NOT EXISTS sub query in FIG. 8 which has a constant rdf:type in its predicate, the NOT EXISTS sub query in FIG. 13 is not selective because this rule has all variables in its consequent. Careful scrutiny of this rule reveals that the property :p cannot be any arbitrary property. It has to be an OWL restriction property, meaning that it has to appear at the object position of triple (:V owl:onProperty :p). Based on observation, the number of properties used in OWL restriction definitions is usually small. This observation leads to the following optimization. An additional predicate is added in the sub query as shown in as shown in FIG. 14 to increase the selectivity. Because the temporary table 452 is partitioned on property ID the additional predicate allows partition pruning thus reducing the I/O required to execute the query.

Note that as an alternative, the sub query in FIG. 14 that starts with "select x.oid from . . . " can also be replaced by a list of constant value Ids that are retrieved using a separate, simple look up query to find all object value Ids of owl: onProperty triples. A constant list of values may allow the SQL optimizer to find a better execution plan.

Note that although this kind of selectivity-increasing optimization has been done on a need-basis, it is possible to extend this idea to general user-defined rules. The key idea is that once statistics on the cardinality of properties used in a consequent of a rule are collected, a predicate can be dynamically added to increase selectivity if the cardinality is small.

Tuning of Parameters and Optimizations

Other possible parameters and optimizations for the inference process includes the following:

Dynamic statistics collection threshold. A default threshold for dynamic statistics collection can be set and tuned. For example, the default threshold can be set at 30%, meaning that, when changes are more than 30%, one round of statistics collection is performed on the temporary table 452. The dynamic statistics collection scheme itself can also be disabled. When statistics are collected, also tunable is the amount of data that needs to be examined in order to compute the statistics.

Parallel index building. The inference engine 450 can be instructed to build indexes in parallel. The level of parallelism is tunable.

Default number of partitions for transitive closure calculation. A partitioned table is used to assist in the calculation of transitive closure. The partitions are based on the distance between the subject and object of a relationship. Newly generated relationships with the same distance are stored in the same partition in this table. The default number of partitions can be set and tuned. For example, a default value can be set at 4. In setting and tuning the default number of partitions, the trade off between the costs of maintaining the number of partitions and the savings in table joins due to partition pruning are considered.

Threshold for exchanging partition. If the number of new triples is small, then it may not be desirable to perform partition exchange using the exchange table 453. Instead, the triples are inserted into the IdTriple Table 455. This is mainly for incremental entailment maintenance. The number of triples at which avoiding the use of the exchange table 453 occurs is tunable. This option can also be disabled.

Hierarchical query over transitive closure algorithm. A hierarchical query can be used, rather than the above described transitive closure algorithm, when inferencing for a small ontology.

Hash partitioning instead of list partitioning. Hash partitioning can be used for the temporary table 452. The temporary table 452 is by default list partitioned. However, in the case where there are "many" different predicates, hash partitioning may be more desirable. The number of partitions is tunable.

Rule Dependency Analysis

Given a set of rules, one well-known optimization is to analyze the dependencies between them and fire rules only when there is a possibility that new triples can be generated. This optimization can eliminate unnecessary rule firings and consequently reduce the total inference time.

In the inventive inference system, a dependency graph is generated by analyzing all pairs of the rules for a particular OWL vocabulary. This dependency graph is then statically included in the system. This effectively reduces the total number of SQL executions. However, the simple syntactic matching technique that is used produced a dependency graph that was more conservative than necessary. To optimize performance, some dependencies were then safely removed from this graph. Consider the following rule:

$$sprdf:typeowl:SymmetricProperty.\ UspV. \rightarrow VspU.$$

It appears that the consequent of the above rule matches the second antecedent and therefore there is a self-dependency. However, this dependency can be safely removed because it is easy to prove that executing this rule twice will only generate duplicates.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

We claim:

1. A method of inferencing semantic data in a relational database system, comprising:
    (a) creating a new partition in a semantic data table in the relational database system, creating an exchange table and a temporary table in the relational database system, wherein the exchange table has the same structure as the semantic data table;
    (b) executing on the semantic data table one or more inference rules for a semantic data model;
        (b1) wherein the inference rules are translated into queries and the executing of (b) comprises executing the queries on the semantic data table;
    (c) adding into the temporary table any newly inferred semantic data generated by the execution of the inference rules;
        (c1) wherein the adding of (c) comprises adding into the temporary table any newly inferred semantic data generated by the executing of the queries on the semantic data table
    (d) copying the inferred semantic data in the temporary table into the exchange table;
    (e) building one or more indexes for the exchange table, wherein the indexes for the exchange table are same as indexes for the semantic data table; and
    (f) exchanging, by using a processor, the indexed semantic data in the exchange table into the new partition in the semantic data table, in which the indexed semantic data has a format associated with the new partition in the semantic data table that is the same format as a format associated with the semantic data table.

2. The method of claim 1, wherein the temporary table is partitioned based on a variable in the semantic data.

3. The method of claim 1, wherein the temporary table is un-indexed.

4. The method of claim 1, wherein the executing (b) and the adding (c) further comprises:
    (c2) repeating (b1) and (c1) until no new semantic data is generated.

5. The method of claim 1, wherein the query comprises one or more antecedents, wherein the executing (b1) comprises:
    (b1i) searching for matched semantic data in the semantic data table for each antecedent of the query;
    (b1ii) joining the matched semantic data based on common variables; and
    (b1iii) producing corresponding consequent semantic data as the inferred semantic data.

6. The method of claim 1, wherein the semantic data in the semantic data table comprises distance information, wherein the distance is used in a calculation of a transitive closure in the execution of the inference rules to restrict each iteration of the transitive closure calculation to paths created in a previous iteration.

7. The method of claim 1, wherein the semantic data in the semantic data table comprises proof information, wherein the proof information concerns a source of the newly inferred semantic data returned by the execution of the inference rules.

8. The method of claim 7, wherein the proof information is used to track a derivation path for the inferred semantic data for identifying possible problems in the semantic data model.

9. The method of claim 1, wherein only one copy of duplicate inferred semantic data is added to the temporary table.

10. The method of claim 9, wherein the temporary table is partitioned based on a variable in the semantic data, wherein in determining if an inferred semantic data is a duplicate of the inferred semantic data in the temporary table, a search is limited to a partition in the temporary table corresponding to a value of the variable.

11. The method of claim 1, wherein one or more of the inference rules comprises a rule with multiple consequents, wherein the executing (b1) comprises:
   (b1i) creating a pivot table comprising rows with integer values corresponding to a number of the multiple consequents;
   (b1ii) performing a Cartesian join of the pivot table with a query that finds all resources with a multiple consequent tag form to produce duplicate resources; and
   (b1iii) converting the found resources into corresponding inferred multiple consequents.

12. A non-transitory computer readable medium with program instructions for inferencing semantic data in a relational database system, comprising instructions for:
   (a) creating a new partition in a semantic data table in the relational database system, creating an exchange table and a temporary in the relational database system, wherein the exchange table has the same structure as the semantic data table;
   (b) executing on the semantic data table one or more inference rules for a semantic data model;
      (b1) wherein the inference rules are translated into queries and the executing of (b) comprises executing the queries on the semantic data table;
   (c) adding into the temporary table any newly inferred semantic data generated by execution of the inference rules;
      (c1) wherein the adding of (c) comprises adding into the temporary table any newly inferred semantic data generated by the executing of the queries on the semantic data table
   (d) copying the inferred semantic data in the temporary table into the exchange table;
   (e) building one or more indexes for the exchange table, wherein the indexes for the exchange table are same as indexes for the semantic data table; and
   (f) exchanging the indexed semantic data in the exchange table into the new partition in the semantic data table, in which the indexed semantic data has a format associated with the new partition in the semantic data table that is the same format as a format associated with the semantic data table.

13. A relational database system for inferencing semantic data according to one or more inference rules for a semantic data model, comprising:
   a persistent storage to store a semantic data table comprising semantic data for the semantic data model; and
   a storage media to store a temporary table and an exchange table, the exchange table having a same structure as the semantic data table, in which the inferencing comprises:
      creating a new partition in the semantic data table,
      executing the inference rules on the semantic data table, wherein the inference rules are translated into queries and the executing comprises executing the queries on the semantic data table;
      adding any newly inferred semantic data generated by the execution of the inference rules into the temporary table, wherein the adding comprises adding into the temporary table any newly inferred semantic data generated by the executing of the queries on the semantic data table
      copying the inferred semantic data in the temporary table into the exchange table,
      building one or more indexes for the exchange table, wherein the indexes for the exchange table are same as indexes for the semantic data table, and
      exchanging the indexed semantic data in the exchange table into the new partition in the semantic data table, in which the indexed semantic data has a format associated with the new partition in the semantic data table that is the same as a format associated with the semantic data table.

14. The system of claim 13, wherein the temporary tables stores only one copy of an inferred semantic data.

15. The system of claim 14, wherein the temporary table is partitioned based on a variable in the semantic data, wherein in determining if an inferred semantic data is a duplicate of the inferred semantic data in the temporary table, a search is limited to a partition in the temporary table corresponding to a value of the variable.

16. The system of claim 13, wherein the temporary table is un-indexed.

17. The system of claim 13, wherein the semantic data in the semantic data table comprises distance information, wherein the distance is used in a calculation of a transitive closure in the execution of the inference rules to restrict each iteration of the transitive closure calculation to paths created in a previous iteration.

18. The system of claim 13, wherein the semantic data in the semantic data table comprises proof information, wherein the proof information concerns a source of the newly inferred semantic data returned by the execution of the inference rules.

19. The system of claim 18, wherein the proof information is used to track a derivation path for the inferred semantic data for identifying possible problems in the semantic data model.

20. The non-transitory computer readable medium of claim 12, in which the temporary table is partitioned based at least in part upon a variable in the semantic data.

* * * * *

UNITED STATES PATENT AND TRADEMARK OFFICE
CERTIFICATE OF CORRECTION

| | | |
|---|---|---|
| PATENT NO. | : 8,401,991 B2 | Page 1 of 1 |
| APPLICATION NO. | : 12/188267 | |
| DATED | : March 19, 2013 | |
| INVENTOR(S) | : Wu et al. | |

It is certified that error appears in the above-identified patent and that said Letters Patent is hereby corrected as shown below:

In the Drawings:

On sheet 2 of 11, in figure 2, line 13, delete "unversity" and insert -- university --, therefor.

On sheet 10 of 11, in figure 13, line 1, delete "distince" and insert -- distinct --, therefor.

In the Specification:

In column 3, line 66-67, delete "domain range" and insert -- domain/range --, therefor.

In column 5, line 35, delete "subclasss" and insert -- subclass --, therefor.

In column 6, line 14, after "application" insert -- . --.

In column 7, line 52, delete "RDFval" and insert -- RDFVal --, therefor.

In column 14, line 29, delete "Atypical" and insert -- A typical --, therefor.

In column 15, line 40, delete "IdTriple" and insert -- IdTriples --, therefor.

In the Claims:

In column 16, line 22, in Claim 1, delete "of" and insert -- for --, therefor.

In column 16, line 27, in Claim 1, delete "the" and insert -- a --, therefor.

In column 16, line 40, in Claim 1, delete "table" and insert -- table; --, therefor.

In column 17, line 39, in Claim 12, delete "in" and insert -- table in --, therefor.

In column 17, line 40, in Claim 12, delete "the" and insert -- a --, therefor.

In column 17, line 47, in Claim 12, delete "by" and insert -- by the --, therefor.

In column 17, line 53, in Claim 12, delete "table" and insert -- table; --, therefor.

In column 18, line 22, in Claim 13, delete "table" and insert -- table; --, therefor.

In column 18, line 32, in Claim 13, delete "same" and insert -- same format --, therefor.

Signed and Sealed this
Ninth Day of July, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,401,991 B2 | Page 1 of 1 |
| APPLICATION NO. | : 12/188267 | |
| DATED | : March 19, 2013 | |
| INVENTOR(S) | : Wu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 787 days.

Signed and Sealed this
Eleventh Day of November, 2014

Michelle K. Lee
*Deputy Director of the United States Patent and Trademark Office*